(12) United States Patent
Meter (10) Patent No.: US 11,864,534 B2
(45) Date of Patent: Jan. 9, 2024

(54) EGG SUPPORT AND APPARATUS FOR HANDLING EGGS

(71) Applicant: SELEGGT GmbH, Cologne (DE)

(72) Inventor: Tjitze Meter, Veenendaal (NL)

(73) Assignee: SELEGGT GmbH, Cologne (DE)

( * ) Notice: Subject to any disclaimer, the term of this patent is extended or adjusted under 35 U.S.C. 154(b) by 668 days.

(21) Appl. No.: 16/763,239

(22) PCT Filed: Nov. 14, 2017

(86) PCT No.: PCT/EP2017/079199
§ 371 (c)(1),
(2) Date: May 12, 2020

(87) PCT Pub. No.: WO2019/096372
PCT Pub. Date: May 23, 2019

(65) Prior Publication Data
US 2021/0169051 A1 Jun. 10, 2021

(51) Int. Cl.
| | | |
|---|---|---|
| *G06F 7/00* | (2006.01) | |
| *A01K 43/00* | (2006.01) | |
| *B65G 47/94* | (2006.01) | |
| *B65G 49/05* | (2006.01) | |
| *G01N 5/04* | (2006.01) | |
| *G01N 35/04* | (2006.01) | |

(52) U.S. Cl.
CPC .............. *A01K 43/00* (2013.01); *B65G 47/94* (2013.01); *B65G 49/05* (2013.01); *G01N 5/04* (2013.01); *G01N 2035/0422* (2013.01)

(58) Field of Classification Search
CPC ...... A01K 43/00; A01K 45/007; B65G 47/94; B65G 49/05; G01N 35/04; G01N 2035/0422
USPC .......................... 73/863.81, 863.91; 700/213
See application file for complete search history.

(56) References Cited

U.S. PATENT DOCUMENTS

| | | | | |
|---|---|---|---|---|
| 4,360,099 A | * | 11/1982 | Niederer ................. | B65B 23/06 198/418.6 |
| 4,487,321 A | * | 12/1984 | Bliss ........................ | B07C 5/00 209/510 |
| 6,029,424 A | * | 2/2000 | McEvoy ................. | B65B 23/06 53/448 |
| 2009/0053803 A1 | * | 2/2009 | Cantineau ............ | A61K 39/145 435/349 |

* cited by examiner

*Primary Examiner* — Yolanda R Cumbess
(74) *Attorney, Agent, or Firm* — N.V. Nederlandsch Octrooibureau (57) ABSTRACT

The present invention relates to an egg carrier for holding an egg in an egg handling system, wherein the egg carrier comprises;
  an egg accommodation,
  an egg clamping system to secure an egg in the egg accommodation space, wherein the egg clamping system is moveable between an egg securing position and an egg release position,
  an operating system coupled with the egg clamping system to move the clamping system between the egg securing position and the egg release position, wherein the operating system comprises an operating member that is operable externally from the egg carrier.

19 Claims, 9 Drawing Sheets

EGG SUPPORT AND APPARATUS FOR HANDLING EGGS

FIELD OF THE INVENTION

The present invention relates to an egg carrier for holding an egg in an egg handling system, wherein the egg carrier comprises an egg accommodation, and an egg clamping system to secure an egg in the egg accommodation space.

BACKGROUND ART

It is known to handle eggs batch wise in a tray such as a setter tray. A typical setter tray has an array of egg accommodations. An egg is held in the egg accommodation by gravity in combination with a fixed shape of the accommodation space, which allows for small and large eggs. As a result an egg can move within the accommodation space. Moving of the eggs especially occurs when the tray is tilted or the eggs are being touched. This means that the exact position of the egg within a tray is not predictable.

SUMMARY OF THE INVENTION

The present invention seeks to provide a type of egg carrier that holds an egg in a firm and predictable way such that an egg in the carrier can be the subject of processes that require a relatively high positional accuracy of the egg.

As a further object, the present invention seeks to solve at least partly a disadvantage of known egg carriers.

In addition, the present invention seeks to provide an alternative egg carrier.

Therefore, the present invention, provides an egg carrier for holding an egg in an egg handling system, wherein the egg carrier comprises;
  an egg accommodation,
  an egg clamping system to secure an egg in the egg accommodation space, wherein the egg clamping system is moveable between an egg securing position and an egg release position,
  an operating system coupled with the egg clamping system to move the clamping system between the egg securing position and the egg release position, wherein the operating system comprises an operating member that is operable externally from the egg carrier.

The egg clamping system has an egg securing position and an egg release position which enables the egg securing position to meet high positional accuracy requirements regarding the position of the egg. The egg carrier having a clamping system and an operating system enables individual handling of an egg with high positional accuracy.

The operating system comprises an operating member that is operable externally from the egg carrier, meaning that the clamping system is driven from outside the egg carrier. The operating system can have one or more operating members. All of these operating members can be operable externally from the egg carrier. The egg accommodation extends in an interior of the egg carrier while the operating system is accessible from an exterior of the egg carrier.

Securing an egg may involve clamping an egg, forming closed engagement with an egg, forcing closed engagement with an egg, etc., to restrain or immobilize the egg with respect to the egg carrier.

The egg carrier can be configured for different requirements. These requirements can involve the need for individual handling of eggs, handling of multiple eggs simultaneously, handling of eggs in a batch or continuous process, etc. The egg carrier can be used in any suitable egg handling system. The egg handling system may include trays, conveyers such as a belt conveyer, slides, etc.

In an embodiment, the egg carrier comprises at least two mutually movable coupled housing members that extend around a central axis of the egg carrier and the egg accommodation.

This enables a compact type of construction while still protecting an egg that is conveyed by the egg carrier.

In an embodiment of the egg carrier, the operating system is distributed over both of the two moveably coupled housing members. This enables integration of the operating member with the moveable housing members and enables movement of the two housing members with respect to each other.

In an embodiment of the egg carrier, the at least two coupled housing members are mutually rotatable around the central axis. This enables a compact type of construction while still protecting an egg that is conveyed by the egg carrier.

In an embodiment, the egg carrier comprises an opening for introducing an egg into the egg accommodation space, and one of the housing members comprises a bowl shaped portion opposite the opening. The bowl shaped portion delimits the egg accommodation. In particular, the opening delimits the egg accommodation, or in other words, the egg carrier extends mainly at one side of the opening. The bowl-shaped portion has a radius r such that the tip of the egg slides to the centre of the bowl shaped portion. This is important since this assures that the egg seeks an upright orientation when securing the egg in the accommodation space with respect to the egg carrier.

In an embodiment of the egg carrier, the operating system comprises a plurality of cooperating transmission members, each transmission member is coupled with one of the at least two housing members. The operating system comprises a number of cooperating transmission members, and having each transmission member coupled with one of the at least two housing members enables transforming of the mutual movement of the two coupled housing members into an egg securing action of the egg clamping system.

In particular, at least two of the cooperating transmission members mutually engage to move the egg clamping system under the effect of wedging. This offers the benefit that self-braking capability may be added to the egg clamping system, which enables securing an egg in the egg carrier while the egg carrier is in an idle state.

The prestress system and the self-braking capability assure both alone and in combination that the egg securing position of the clamping system can only be released by applying a mutual rotation to the housing members and not by a force directly applied to the egg, for example by a force from a needle onto the egg shell.

In an embodiment of the egg carrier, the at least one of the cooperating transmission members is integrally formed with one of the at least two housing members. This enables a compact type of construction of the egg carrier.

In an embodiment of the egg carrier, the number of cooperating operating members comprises a pair of spaced operating members. This enables exertion of a torque to the egg carrier and movement of the moveably coupled housing members. This also enables tilting of the entire egg carrier. In particular the pair of spaced operating members are arranged at opposite sides of the egg carrier. One has to distinguish between the operating members and the transmission members. The operating members set the egg clamping system in motion while the transmission members only transform motion. for example, from an angular movement to a linear motion. In particular, one of the pair of spaced operating members is configured to fixedly attach to a tray. The tray can hold a number of egg carriers.

In an embodiment of the egg carrier, the number of cooperating operating members comprises a pair of operating members arranged at a side of the egg carrier opposite the egg accommodation space. This results in more freely accessible egg accommodations wherein an egg can be introduced into or released out from the egg accommodation without hindrance. In addition, an egg in the egg accommodation is more freely accessible.

In an embodiment of the egg carrier, at least one of the number of cooperating operating members is integrally formed with one of the at least two housing members. This enables a compact type of construction of the egg carrier.

In an embodiment of the egg carrier, the egg clamping system comprises a number of egg clamping members, for example three egg clamping members. An egg clamping member can be stationary or moveable as long as the egg clamping system is moveable between an egg clamp securing position and an egg release position.

In an embodiment of the egg carrier, each of the number of egg clamping members are moveable between the egg securing position and the egg release position. This facilitates releasing and securing of an egg.

In an embodiment of the egg carrier, the number of egg clamping members are arranged symmetrically around the central axis. This arrangement, around the central axis of the egg carrier and egg accommodation, offers a predictable position and orientation with respect to the egg carrier of an egg that is secured in the egg accommodation. This axisymmetric arrangement of the number of egg clamping members in combination with the bowl shaped portion assures that the egg seeks and maintains a central position and an upright orientation when securing the egg in the accommodation space with respect to the egg carrier.

In an embodiment of the egg carrier, the operating system is configured to move all of the number of egg clamping members in an even manner, or in an even and simultaneous manner. This offers an even more predictable position and orientation with respect to the egg carrier of an egg that is secured in the egg accommodation.

In an embodiment, the egg carrier comprises a prestress system to prestress the egg clamping system towards the egg clamp position. This offers a robust securing of an egg in the egg accommodation of the egg carrier. In particular, the prestress system forces the two housing members in a predetermined mutual angular position in which position the egg clamping system is in the egg securing position.

Therefore, an assembly of a number of interlinked egg carriers as defined above are provided. This enables the assembly to hold and/or convey a number of eggs simultaneously in a continuous process or batch process. The number of interlinked egg carriers is, for example, between 35 and 45. The interlinked carriers are grouped and can even form a chain. It is however also conceivable that stationary housing members of interlinked egg carriers are formed as one part.

In an embodiment of the assembly, the egg carriers are interlinked through at least one of the externally operable operating members. This way, there is no additional member required to link egg carriers. In addition, this enables joint operation of interlinked carriers.

The present invention also provides a tray, comprising a tray interior accommodating an assembly as defined above, wherein operating members are connectable or coupled for joint operation of interlinked egg carriers. The tray and egg carriers are configured such that egg carriers are arranged in a predetermined orientation with respect to the tray.

The present invention also provides an egg processing system comprising an egg holder, such as a tray, or an egg conveyor, and an egg carrier as defined above, the egg conveyer configured for in use conveying the egg carrier in a conveying direction, wherein the egg conveyer comprises a first cam profile for contacting the pair of spaced operating members in order to operate the egg clamping system between the egg clamp securing position and the egg release position. In particular, the conveyer comprises a substantially flat conveying surface and the first cam profile is arranged in the substantially flat conveying surface. It will be understood that the first cam profile can be passive, that is stationary, or active, which means that the cam profile can be activated as desired.

In an embodiment of the egg processing system, the conveyer comprises a second cam profile for contacting the pair of operating members arranged at opposite sides of the egg carrier in order to tilt the egg carrier around a horizontal axis. In particular, the second cam profile is arranged in a plane transverse with respect to the flat conveying surface. Again, it will be understood that the second cam profile can be passive, that is stationary, or active, which means it can be activated as desired.

The present invention provides a use of an egg processing system as defined above, comprising one or more of the following steps:

receiving an egg in an accommodation space,
position the egg in predetermined sampling position with respect to the egg carrier
securing the egg in the accommodation space, in the predetermined sampling position with respect to the egg carrier,
tilting the egg carrier around an horizontal axis into a tilted position, wherein in particular in the tilted position the longitudinal axis of the egg makes an angle with the vertical of between 200 and 90°, like for example about 45°,
maintaining the egg in the predetermined tilted position during a settling time in particular at least 30 seconds, more particular between 2 and 15 minutes, like for example 10 minutes prior to, and
taking an allantoic fluid sample from the egg.

In an embodiment, the use comprises operating a plurality of egg carriers simultaneously.

In an embodiment, the use comprises tilting the egg carrier around a horizontal axis to face an opening of the egg accommodation downwards, and in particular releasing an egg clamping system to remove the egg out of the egg accommodation. This facilitates removal of an egg out of the egg accommodation based on gravity.

SHORT DESCRIPTION OF DRAWINGS

The present invention will be discussed in more detail below, with reference to the attached drawings, in which.

DESCRIPTION OF EMBODIMENTS

Figure 1:
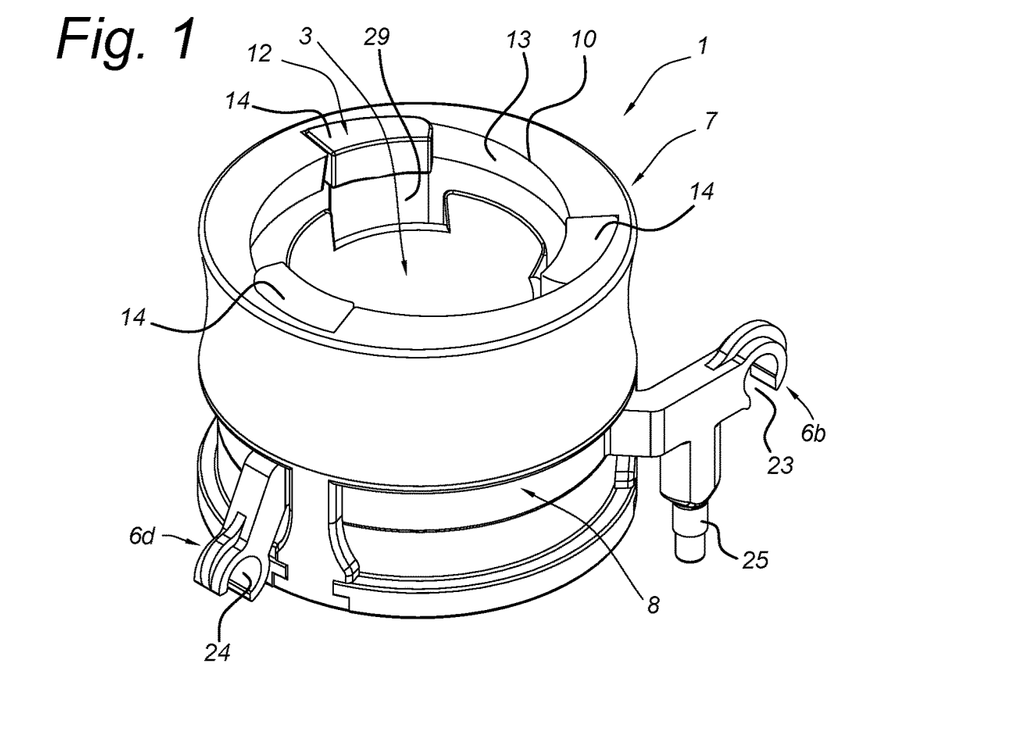
FIG. 1 shows an first embodiment of an egg carrier according to the invention in perspective view.

FIG. 1 shows an egg carrier 1 according to the invention in perspective view. The egg carrier will be described with respect to FIGS. 1-5.

The egg carrier 1 is configured for holding an individual egg (not shown). Also, the egg carrier is configured to be used in an egg handling system, like an egg conveying system 2 as shown in FIG. 6-9.

In order to hold an egg, the egg carrier 1 comprises an egg accommodation 3. The egg accommodation 3 is delimited by an opening 10 and a bowl shaped portion 11. The opening 10 is arranged opposite the bowl shaped portion 11. The opening 10 has a generally circular shape for introducing an egg into the egg accommodation 3. The bowl shaped portion 11 has a cavity 27 to receive a portion of an egg. The cavity 27 has a surface that contacts the egg, and the surface has a texture designed to slide the tip of the egg to the deepest point of the cavity 27. The cavity 27 has a radius r that is greater than the radius of a pointed half of an egg. The cavity 27 has a radius r of about 16 mm.

The egg carrier 1 comprises two housing members 7, 8. The two housing members 7, 8 extend around a central axis 9 of the egg carrier 1. The two housing members 7, 8 extend around the egg accommodation 3. The two housing members 7, 8 extend continuously around the egg accommodation 1. The outer housing member 7 has a generally cylindrical shape. The inner housing member 8 extends mainly within the outer housing member 7 as can be best seen in FIG. 5. The bowl shaped portion 11 that has a cavity 27 to receive a portion of an egg is part of the inner housing member 8. The inner housing member 8 is restrained within the outer housing member 8 by a closing plate member 28 as is clear from FIG. 4, and FIG. 5 where the closing plate member 28 is taken away. The two housing members 7, 8 are mutually movably coupled. The two coupled housing members 7, 8 are mutually moveable around the central axis.

Figure 2:
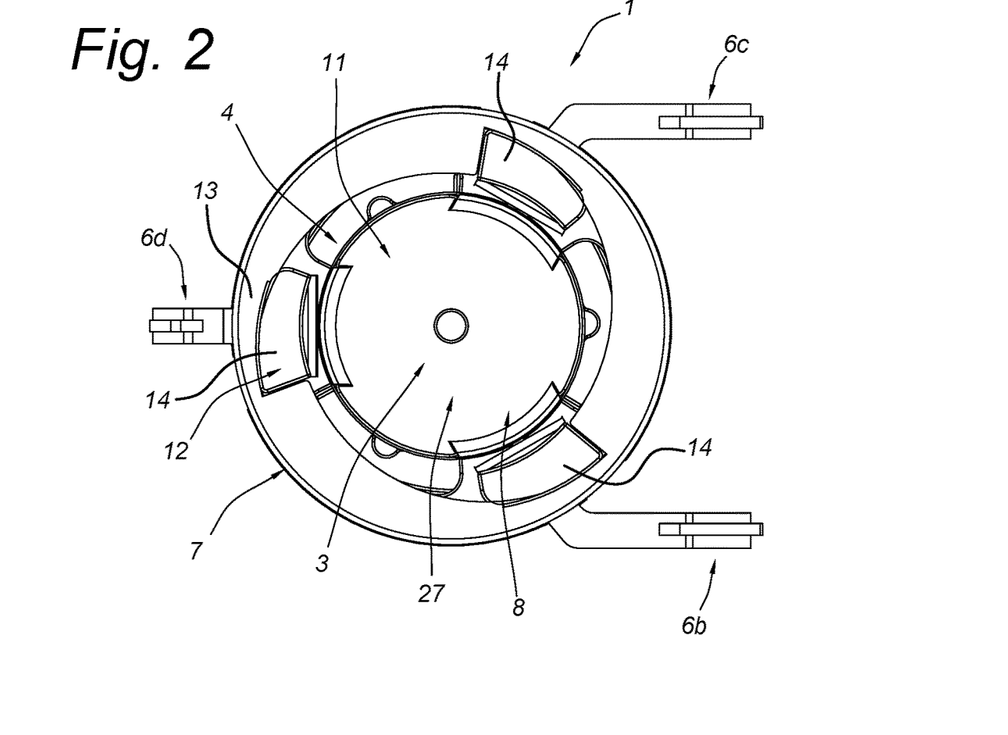
FIG. 2 shows the egg carrier of FIG. 1 in top view.

The egg carrier 1 comprises an egg clamping system 4. The egg clamping system 4 is configured to secure an egg in the egg accommodation 3. In order to secure an egg in, and to introduce and release an egg in and out the egg accommodation 3, the egg clamping system 4 is moveable between an egg securing position and an egg release position which is shown in FIG. 2. The egg clamping system 4 comprises a number of egg clamping members 14. The egg clamping member 14 can be flexible, deformable when required to conform the egg clamping member 14 to the shape of an egg. In this case, the egg clamping system 4 has three egg clamping members 14. Here, each of the three egg clamping members 14 are moveable between the egg securing position and the egg release position. In order to secure an egg in a predictable way, the three egg clamping members 14 are arranged symmetrically around the central axis 9 of the egg carrier 1. The three egg clamping members 14 are moveable in a pure radial direction towards and from the central axis 9 in order to move between the egg securing position and the egg release position.

The egg carrier 1 comprises an operating system 5. The operating system 5 is coupled with the egg clamping system 4 to move the egg clamping system 4 between the egg securing position and the egg release position. The operating system 5 is configured to operate the clamping system 4, or in other words, the clamping system 4 is set in motion through the operating system 5. The operating system 5 comprises, in this case, four operating members 6a, 6b, 6c, 6d. All of these four operating members 6a, 6b, 6c, 6d are operable externally from the egg carrier 1.

The operating system 5 is distributed over both the two moveably coupled housing members 7, 8. This means that each of the two moveably coupled housing members 7, 8 are provided with at least one of the operating members 6a, 6b, 6c, 6d.

The number of cooperating operating members 6a, 6b, 6c, 6d comprises a pair of spaced operating members, for example, such as operating members 6a and 6b. The operating members 6a and 6b are arranged at opposite sides of the egg carrier 1. The operating members 6a and 6b are arranged at a side of the egg carrier 1 opposite the egg accommodation 3. The operating member 6a is firmly connect to the outer housing member 7. The operating member 6b is firmly connect to the inner housing member 8. A torque can be applied to the egg carrier 1 through the pair of operating members 6a and 6b. The two moveably coupled outer- and inner-housing members will start rotating with respect to each other around the central axis 9 when a torque is applied through the pair of operating members 6a and 6b.

One can distinguish another pair of operating members 6b and 6d, as shown in FIGS. 1-5. The operating members 6b and 6d are arranged at opposite sides of the egg carrier 1. The operating members 6b and 6d are arranged at a side of the egg carrier 1 opposite the egg accommodation 3. The operating member 6b and 6d are firmly connected to the egg carrier 1, here to the inner housing member 8. A torque can be applied to the egg carrier 1 through the pair of operating members 6b and 6d. The entire egg carrier 1 will start to rotate with respect to the horizontal when a torque is applied through the pair of operating members 6b and 6d. Operating member 6c is useful to rotate the egg carrier 1 with respect to the horizontal. Operating members 6b and 6c have hooks 23. These hooks 23 are aligned and the egg carrier 1 can rotate in a robust way around these aligned hooks 23. Operating members 6b and 6d also have hooks 23, 24. These hooks 23, 24 can receive a pin 30, shown in FIG. 8, that defines the rotation of the egg carrier 1. In this case, all of the operating members 6b, 6c and 6d are integrally formed with the inner housing member 8.

Figure 8:
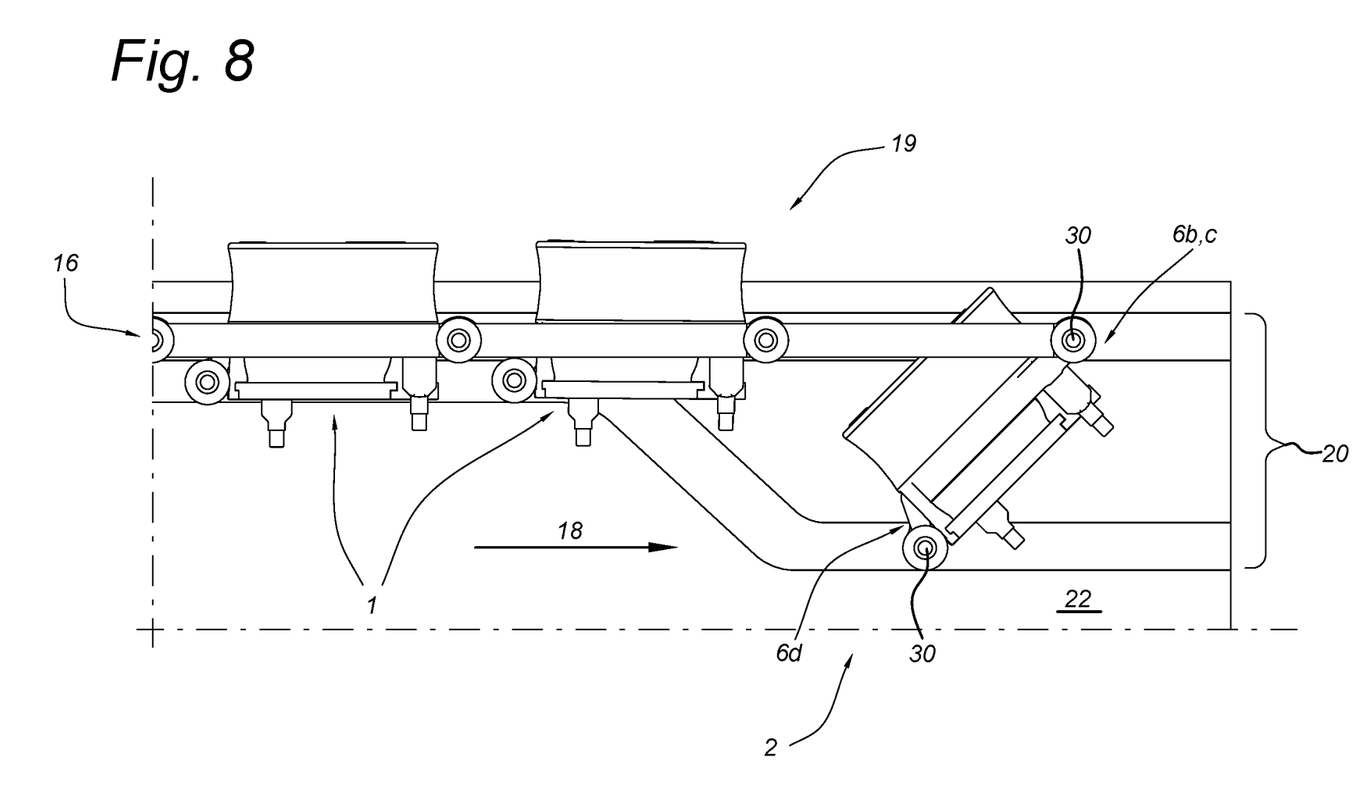
FIG. 8 shows a side view of a portion of another embodiment of an egg conveyer.
Figure 13:
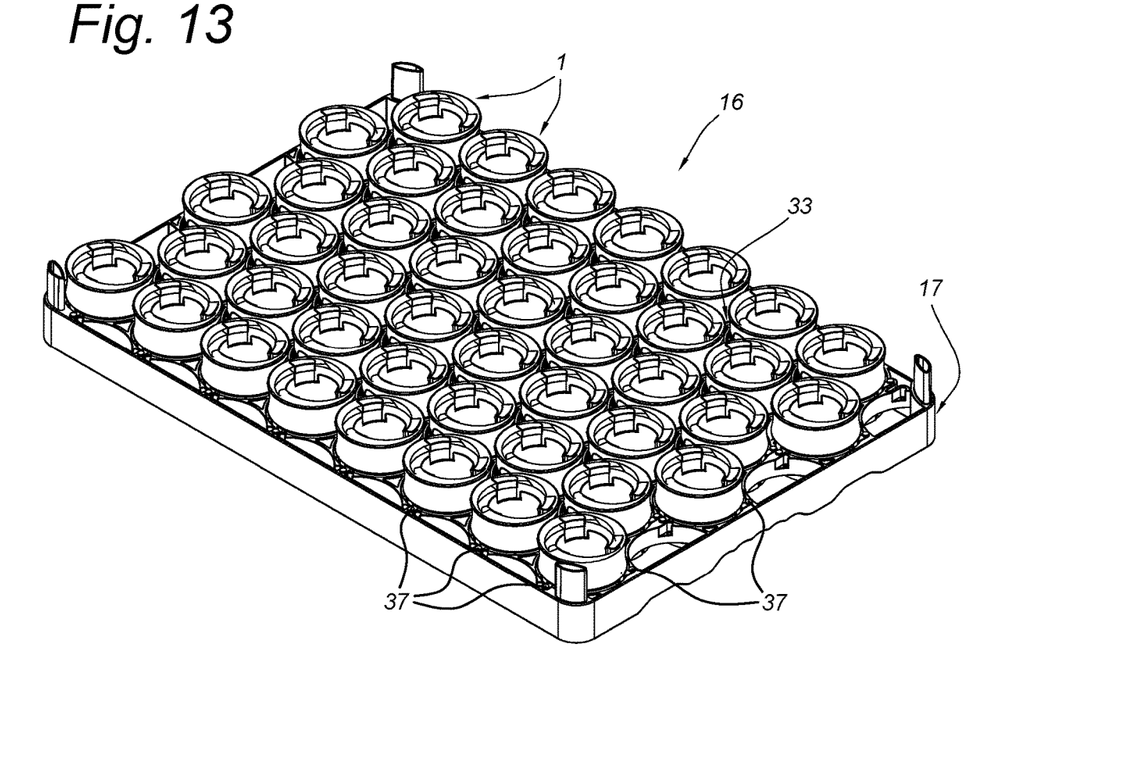
FIG. 13 shows a tray in perspective view, supporting an assembly of egg carriers of FIG. 10.

The inner housing member 8 has a central body 31 and a continuous annular ring member 32 around the central body. The central body 31 forms the cavity 27. The egg clamping members 14 and the operating members 6b, 6c and 6d protrude from the annular ring member 32. A respective egg clamping member 14 and a respective operating member 6b, 6c and 6d protrude from the annular ring member 32 from about the same position on the annular ring member 32. Therefore a direct coupling between an egg and an outside support, such as a conveyer 2 or a tray as shown in FIG. 13, is obtained. This provides support of an egg with positional accuracy. In a tilted position of the egg carrier 1 as shown in FIG. 8, the operating member 6d and the respective clamping member 14 are vertically aligned in order to provide optimal support to an egg in the egg accommodation 3 in case of a vertical load on the egg.

Figure 3:
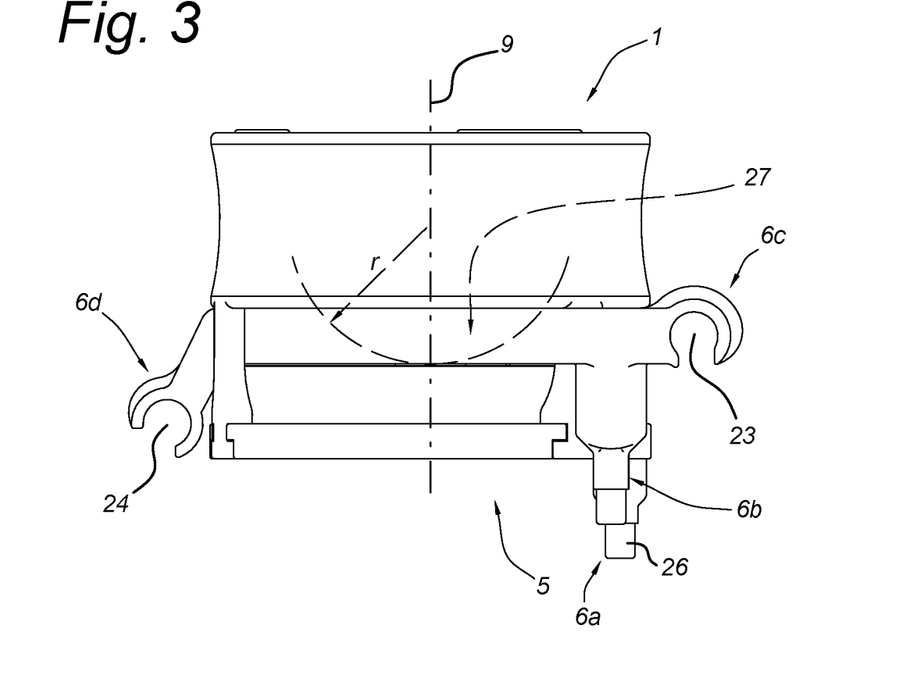
FIG. 3 shows the egg carrier of FIG. 1 in side view.
Figure 4:
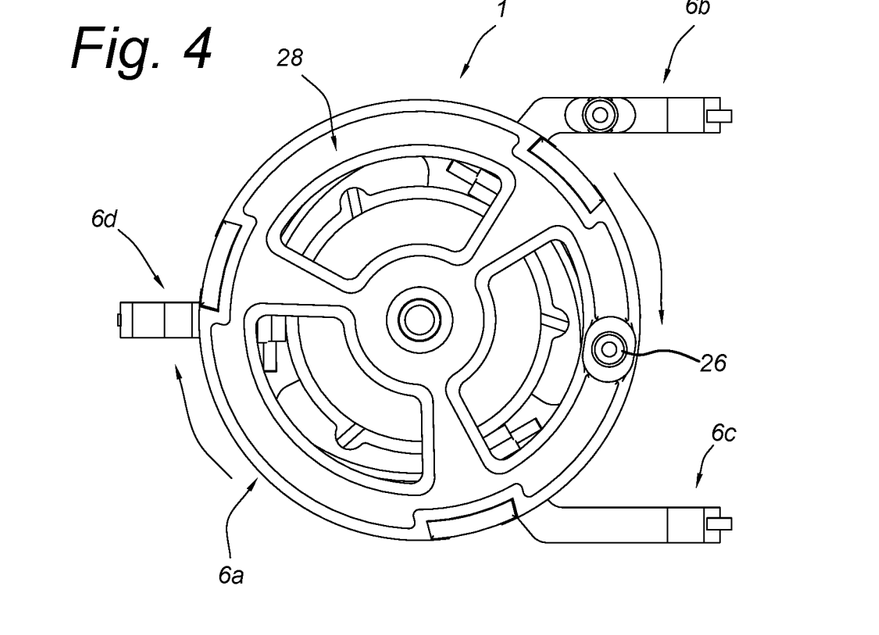
FIG. 4 shows the egg carrier of FIG. 1 in bottom view.

The outer housing member 7 comprises an operating member 6a, as shown in FIG. 3. The operating member 6a has a cam 26. The cam 26, which is firmly connected with the outer housing member 7. Here, the operating member 6a is integrally formed with the closing plate member 28. The closing plate member 28 forms a unity structure with the outer housing member 7. The cam 26 is arranged at an outer circumference of the outer housing member 7. The cam 26 is arranged at a side of the egg carrier 1 opposite the egg accommodation 3. The inner housing member 8 comprises an operating member 6b. The operating member 6b has a cam 25. The cam 25 is firmly connected with the inner housing member 8. The cam 25 is arranged at an outer circumference of the inner housing member 8. The cam 25 is arranged at a side of the egg carrier 1 opposite the egg accommodation 3. The pair of cams 25, 26 can be controlled by a cam profile. In other words, the pair of cams 25, 26 do, in use, form a part of a cam mechanism. The control of the pair of cams 25, 26 manages the clamping system 4.

The operating system 5 comprises a pair of cooperating transmission members 12, 13. Each transmission member 12, 13 is coupled with one of the at least two housing members 7, 8. The transmission member 12 is coupled with the inner housing member and is integrally formed with a clamping member 14. The transmission member 13 is part of the outer housing member 7. The transmission member 13 is integrally formed with the outer housing member 7. The pair of cooperating transmission members 12, 13 have bodies that taper in opposite directions along the circumference. Therefore, when the pair of cooperating transmission members 12, 13 mutually engage, they move the egg clamping member 14 radially inward towards the central axis 9 under the effect of wedging when the two housing members 7, 8 mutually rotate. The clamping member 14 can move back when allowed under spring action. Therefore, the clamping member 14 is supported by a leaf spring 29. In this case, each respective clamping member 14 is driven through a respective pair of cooperating transmission members 12, 13. Therefore, the operating system 5 (that includes the cooperating transmission members 12, 13(is configured to move all of the egg clamping members 14 in an even manner.

Figure 5:
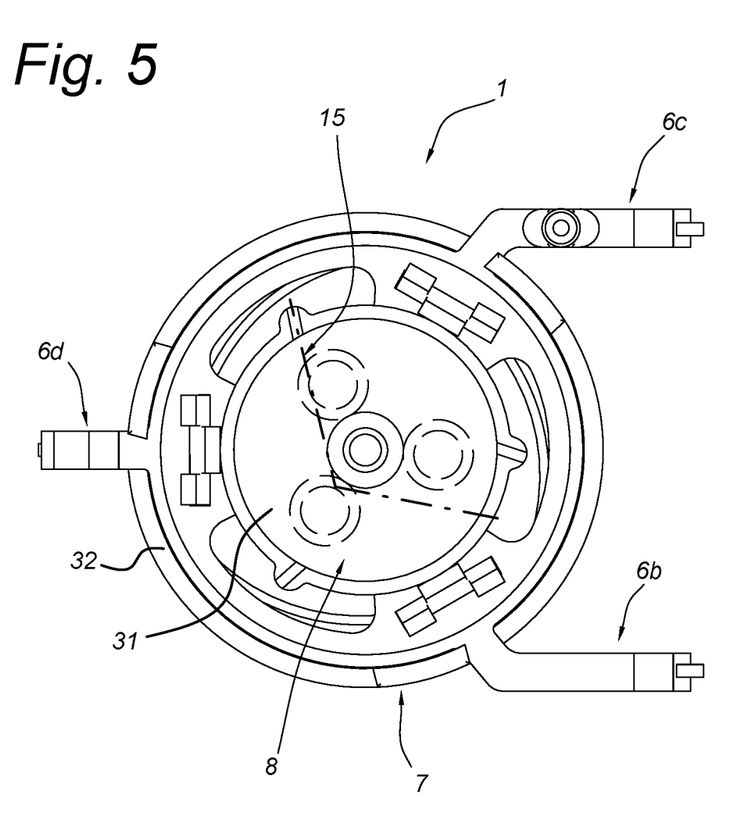
FIG. 5 shows the view of FIG. 4 with a bottom portion taken away.

As can be seen in FIG. 5, the egg carrier 1 comprises a prestress system 15. The prestress system 15 is configured to prestress the egg clamping system 4 towards the egg securing position, which is the default position when the egg carrier is in the idle state. The prestress system 15 engages the two housing members 7, 8 to force them into a predetermined mutual angular position. In use, the operating system 5 works opposite the prestress system 15 to force the egg clamping system 4 towards the egg release position. Here, the prestress system 15 is in the form of a torsion spring. The coil of the torsion spring is centrally arranged in the egg carrier 1. The coil of the torsion spring extends centrally along the central axis 9. Here, as an example, the torsion spring has a spring stiffness between 0.4 and 1 Nmm/°. This way, there is a balance between positional accuracy of the egg in the egg carrier 1 and the gentle care that is required while handling an egg. The prestress system 15 may comprise a number of torsion springs, for example, three torsion springs. In use, the prestress system 15 exerts an effective torque on the egg carrier 1 of between 100 to 300 Nmm.

Figure 6:
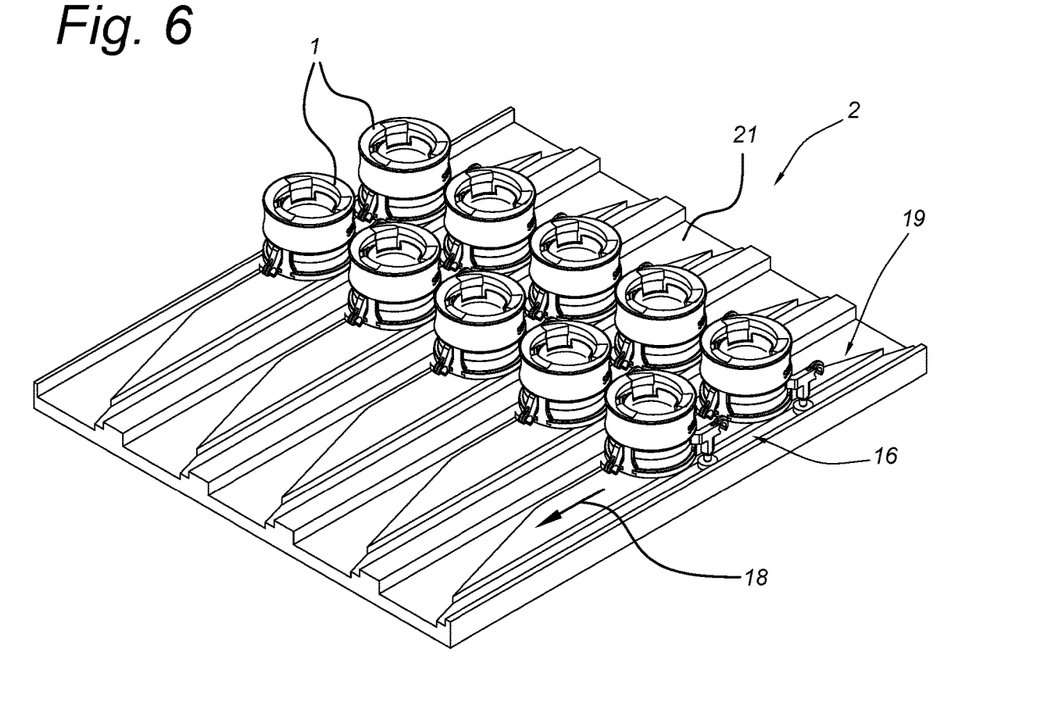
FIG. 6 shows a portion of an egg conveyer in perspective view.
Figure 7:
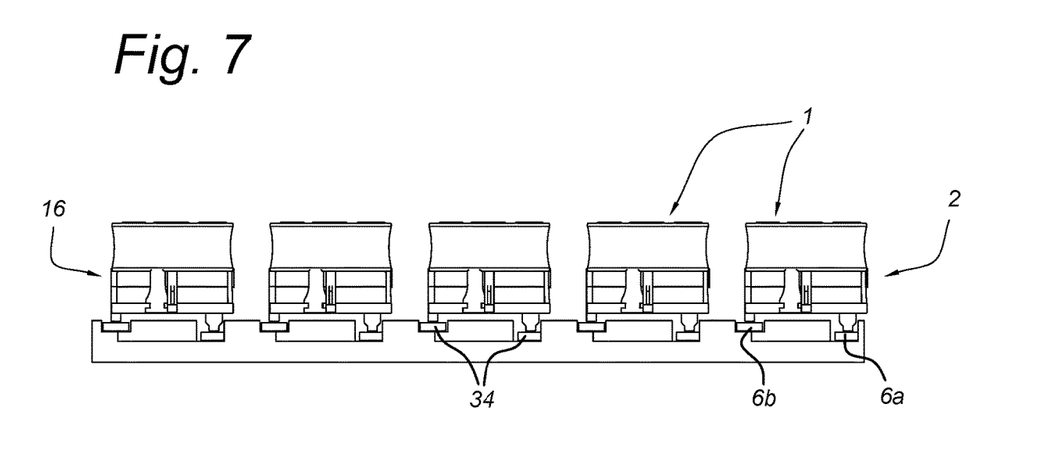
FIG. 7 shows a side view of the egg conveyer of FIG. 6.

FIG. 6 shows a portion of an egg conveyer 2 in perspective view. FIG. 7 shows a side view of the egg conveyer 2 of FIG. 6. The egg conveyer 2 forms a part of an egg processing system, which is not described. In use, the egg conveyor 2 moves an egg carrier 1 in a conveying direction 18. The egg conveyer 2 comprises a first cam profile 19 for contacting the pair of spaced operating members 6a, 6b. The conveyer 2 comprises a substantially flat conveying surface 21. The first cam profile 19 is arranged in the substantially flat conveying surface 21. The operating members 6a, 6b are arranged at a side of the egg carrier 1 opposite the egg accommodation 3. The cam profile 19 contacts the operating members 6a, 6b in order to operate the egg clamping system 4 between the egg securing position and the egg release position. The cam profile 19 contacts the operating members 6a, 6b through the cams 25, 26. Here, the cam profile 19 contacts the operating members 6a, 6b through the cams 25, 26 via wheel members 34.

FIG. 8 shows a side view of a different portion of the egg conveyer 2. The conveyer comprises a second cam profile 20. The second cam profile 20 is configured for contacting the pair of operating members 6b, 6c, 6d. The operating members 6b, 6c, 6d are arranged at opposite sides of the egg carrier 1 in order to tilt the egg carrier 1 around a horizontal axis. The second cam profile 20 is arranged in a plane 22 transverse with respect to the flat conveying surface 21.

FIGS. 6-9 show assemblies 16 of a number of interlinked egg carriers 1 of FIG. 1-5. The egg carriers 1 are interlinked through the operating members 6b, 6c and 6d, in particular through the hooks 23, 24 thereof.

Figure 9:
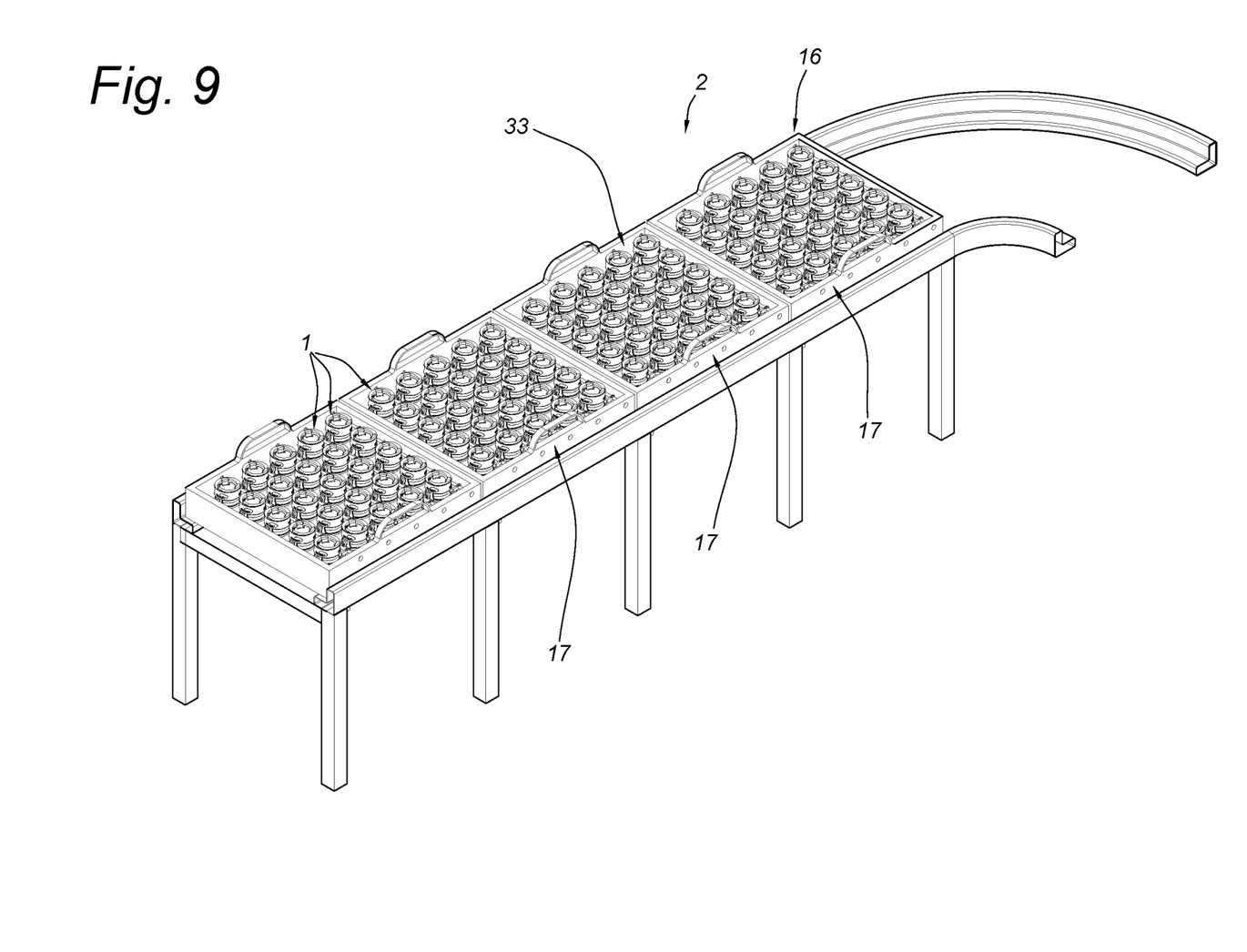
FIG. 9 shows a perspective view of another embodiment of an egg conveyer.

FIG. 9 shows tray 17. The tray comprises a tray interior 33 accommodating an assembly 16 of interlinked egg carriers 1. The respective operating systems 5 are coupled (not shown) for joint operation of interlinked egg carriers 1. It is of course conceivable that egg carriers 1 are individually operated in the tray 17. The trays 17 are moved in a conveyer 2, which is a slide in this case. Of course, any other suitable conveyer will suffice, e.g. a conveyer belt.

Referring to all figures, as an example, the egg carrier 1 can be used by an egg conveyer 2 in an egg processing system which can perform a method comprising one or more of the following steps:receiving an egg in an accommodation space 3, position the egg in a predetermined sampling position with respect to the egg carrier 1, securing an egg in the accommodation space 3, in the predetermined sampling position with respect to the egg carrier 1, tilting the egg carrier 1 around an horizontal axis into a tilted position, as shown in FIG. 8, then maintaining the egg in the predetermined tilted during a settling time, in particular at least 30 seconds, more particular between 2 and 15 minutes, prior to taking an allantoic fluid sample from the egg.

As an option, the egg processing system method comprises the step of tilting the egg carrier 1 around a horizontal axis to face the opening 10 of the egg accommodation 3 downwards, and releasing an egg clamping system 4 to remove the egg out of the egg accommodation 3.

The settling time is at least 5 minutes, for example between 5 and 15 minutes, such as 10 minutes. In the tilted position of the egg carrier 1, the longitudinal axis of the egg in the egg accommodation 3 makes an angle of about 450 with the vertical.

A plurality of eggs can be processed simultaneously or individually as desired. This can also differ per process step. For example, transport of egg carriers 1 can be simultaneous while the taking of an allantoic fluid sample from the egg is performed individually, subsequent to the transport.

Figure 10:
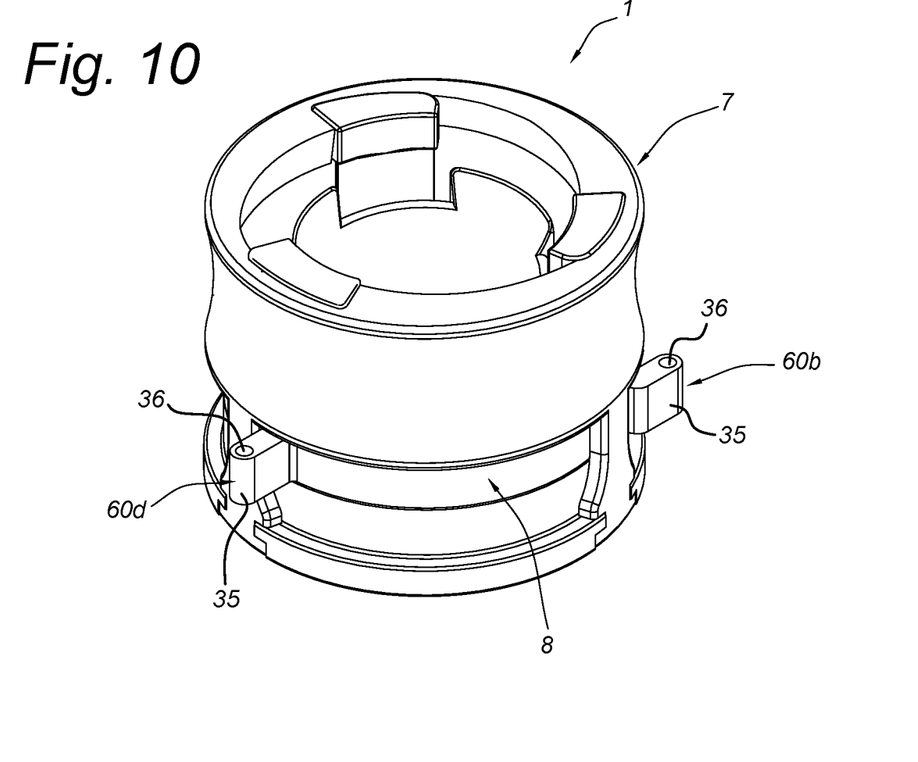
FIG. 10 shows a second embodiment of an egg carrier in perspective view.
Figure 11:
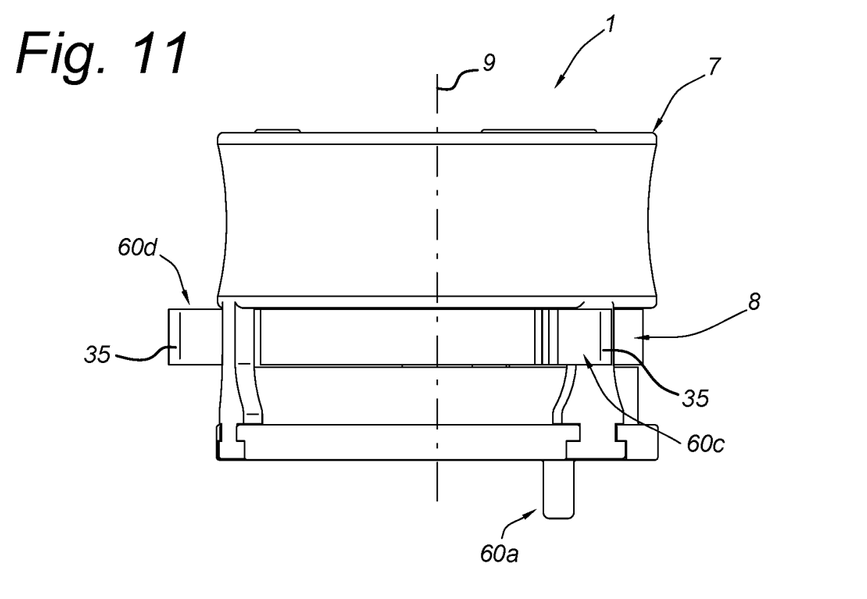
FIG. 11 shows the egg carrier of FIG. 10 in side view.
Figure 12:
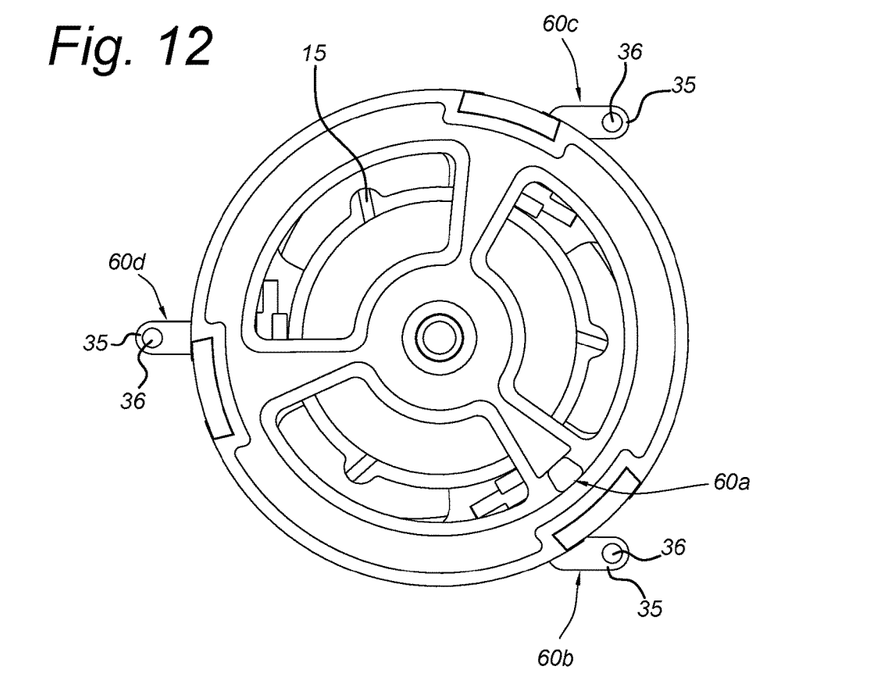
FIG. 12 shows the egg carrier of FIG. 1 in bottom view.

FIGS. 10-12 show a second embodiment of an egg carrier according to the invention in different views. In general, only differences with the first embodiment of FIGS. 1-5 are described. The operating members 60*b*, 60*c* and 60*d* are firmly connected to the inner housing member 8 of the egg carrier 1. The operating members 60*b*, 60*c* and 60*d* are each configured to slide in a respective socket. To facilitate sliding of an operating member 60*b*, 60*c* and 60*d* in a respective socket the operating members 60*b*, 60*c* and 60*d* have rounded ends 35. To be able to assist sliding of an operating member 60*b*, 60*c* and 60*d* out of a respective socket, the operating members 60*b*, 60*c* and 60*d* are provided with a through hole 36. The operating member 60*a* is firmly connected to the outer housing member 7 of the egg carrier 1.

FIG. 13 shows a tray 17 in perspective view, supporting an assembly 16 of egg carriers 1 of FIG. 10. The egg carriers 1 are assembled together through the tray 17 to form the assembly 16. The egg carriers 1 are assembled in the interior 33 of the tray 17. Therefore, the tray 17 comprises a plurality of sockets 37. The sockets 37 are configured to receive the operating members 60*b*, 60*c* and 60*d* in a sliding manner. The tray 17 secures the inner housing member 7 of the egg carrier 1 while the outer housing member 7 of the egg carrier 1 is free to rotate with respect to the inner housing member 8. The tray 17 has an open structure to enable access to the operating member 60*a* that is firmly connected to the outer housing member 7 of the egg carrier 1. The tray 17 thus comprises a tray interior 33 accommodating an assembly 16, wherein operating members are connectable for joint operation of interlinked egg carriers 1.

Figure 14:
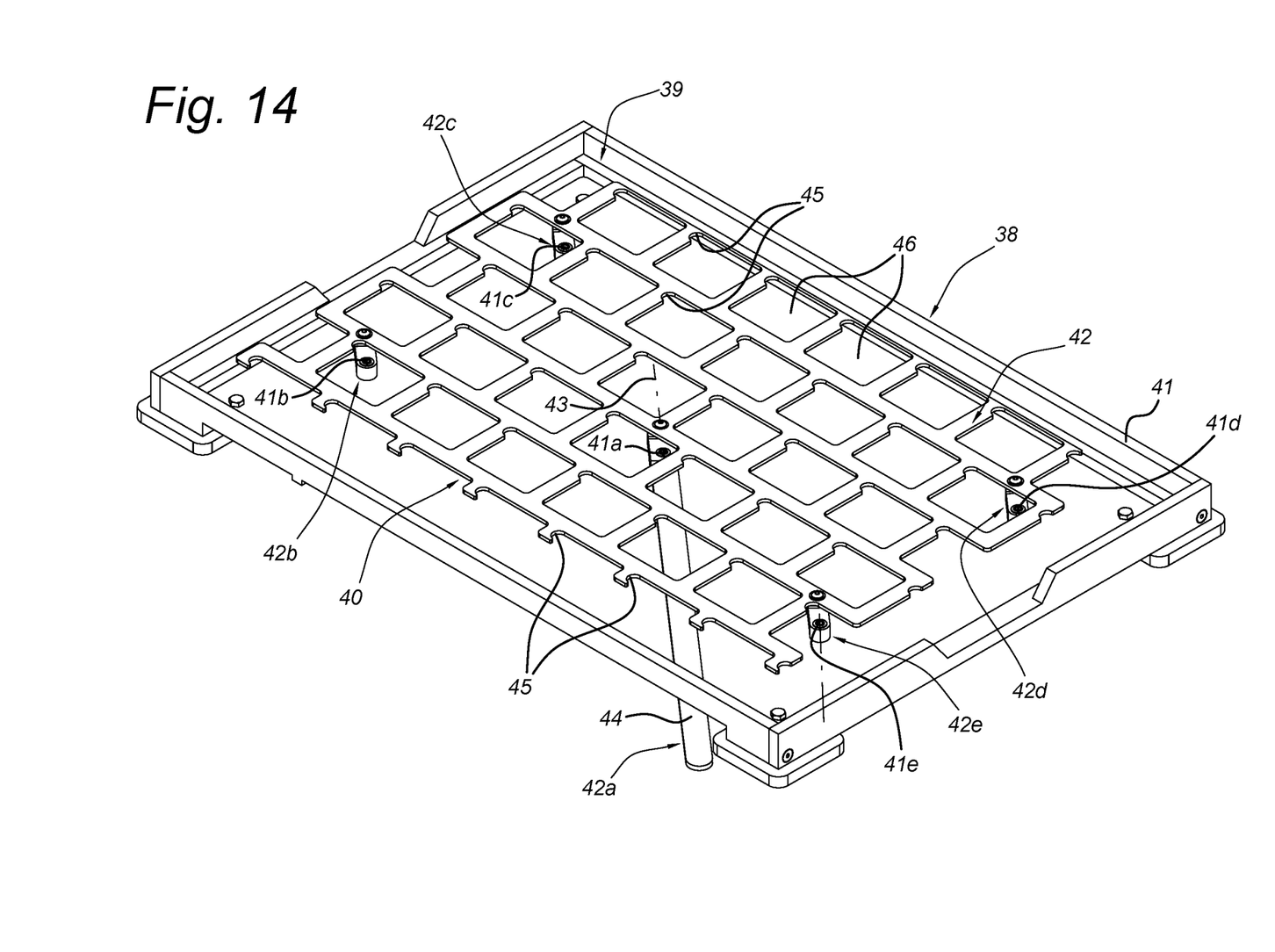
FIG. 14 shows in perspective view an operating station for the tray of FIG. 13.

FIG. 14 shows in perspective view an operating station 38 for the tray of FIG. 13. The operation station 38 has a receiving space 39 for receiving a tray 17 in a tray installed position (not shown). In the tray installed position the bottom of the tray 17 faces the operation station 38. The operating station 38 comprises an operating member 40. In this case, the operating member 40 is made out of sheet material. The operating member 40 comprises a plurality of stops 45. The plurality of stops 45 matches the plurality of egg carriers 1 of tray 17 to facilitate simultaneous operating of all of the plurality of egg carriers 1 of tray 17 through the operating member 40 of the operating station 38. The stops 45 are configured to each contact and operate an associated operating member 60*a* of the egg carrier 1. A stop 45 can have any suitable configuration, e.g. a slot, a curved surface. A number of openings 46 is formed in the operating member 40. Here, each stop 45 is formed with a contour of an associated opening 46. The operating member 40 is moveably arranged with respect to the remainder of the operating station 38, such as the base 41 of the operating station 38. Therefore, the operating station 38 comprises a parallelogram linkage system 41, 42 coupled with the operating member 40. The operating member 40 is therefore an articulated platform. The parallelogram linkage system has a number of hinges 41A-41E and a number of link members 42A-42E. One link member 42A comprises a lever 44. The lever 44 is aligned with the link member 42A. The lever 44 is operable from the exterior of the operating station 38. The parallelogram linkage system is configured such that the movement of the operating member 40 corresponds with a required movement of an operating member 60*a* to operate the associated egg carrier 1 between the egg securing position and the egg release position.

The present invention has been described above with reference to a number of exemplary embodiments as shown in the drawings. Modifications and alternative implementations of some parts or elements are possible, and are included in the scope of protection as defined in the appended claims.

The invention claimed is:

1. An egg carrier for holding an egg in an egg handling system, wherein the egg carrier comprises:
   an egg accommodation,
   an egg clamping system to secure an egg in the egg accommodation space, wherein the egg clamping system is moveable between an egg securing position and an egg release position,
   an operating system coupled with the egg clamping system to move the egg clamping system between the egg securing position and the egg release position, wherein the operating system comprises an operating member that is operable externally from the egg carrier, and
   at least two mutually movable coupled housing members that extend around a central axis of the egg carrier and the egg accommodation.

2. The egg carrier according to claim 1, wherein the operating system is distributed over both the two moveably coupled housing members.

3. The egg carrier according to claim 1, wherein the at least two coupled housing members are mutually rotatable around the central axis.

4. The egg carrier according to claim 1, comprising an opening for introducing an egg into the egg accommodation space, and wherein one of the housing members comprises a bowl shaped portion opposite the opening.

5. The egg carrier according to claim 1, wherein the operating system comprises a number of cooperating transmission members, each transmission member coupled with one of the at least two housing members.

6. The egg carrier according to claim 5, wherein at least two of the number of cooperating transmission members mutually engage to move the egg clamping member.

7. The egg carrier according to claim 1, wherein the egg clamping system comprises a number of egg clamping members and wherein the operating system is configured to move all of the number of egg clamping members in an even manner.

8. The egg carrier according to claim 1, comprising a prestress system to prestress the egg clamping system towards the egg securing position.

9. An assembly of a plurality of interlinked egg carriers, wherein
   each egg carrier comprises:
      an egg accommodation,
      an egg clamping system to secure an egg in the egg accommodation space, wherein the egg clamping system is moveable between an egg securing position and an egg release position,
      an operating system coupled with the egg clamping system to move the egg clamping system between the egg securing position and the egg release position, wherein the operating system comprises an operating member that is operable externally from the egg carrier, and
      at least two mutually movable coupled housing members that extend around a central axis of the egg carrier and the egg accommodation.

10. The assembly according to claim 9, wherein the egg carriers are interlinked through at least one of the externally operable operating members.

11. The assembly according to claim 9, wherein the operating member of each egg carrier is coupled or connectable to the operating member of another egg carrier for joint operation of interlinked egg carriers.

12. An egg processing system comprising a conveyer for conveying an egg carrier in a conveying direction, the egg carrier comprising:
   an egg accommodation,
   an egg clamping system to secure an egg in the egg accommodation space, wherein the egg clamping system is moveable between an egg securing position and an egg release position,
   an operating system coupled with the egg clamping system to move the egg clamping system between the egg securing position and the egg release position, wherein the operating system comprises an operating member that is operable externally from the egg carrier, and
   at least two mutually movable coupled housing members that extend around a central axis of the egg carrier and the egg accommodation, wherein the egg conveyer comprises a first cam profile for contacting a pair of spaced operating members in order to operate the egg clamping system between the egg securing position and the egg release position.

13. The egg processing system according to claim 12, wherein the conveyer comprises a second cam profile for contacting the pair of operating members, the second cam profile being arranged at opposite sides of the egg carrier in order to tilt the egg carrier around a horizontal axis.

14. The egg processing system according to claim 13, wherein the conveyer comprises a substantially flat conveying surface and the first cam profile is arranged in the substantially flat conveying surface.

15. The egg processing system according to claim 14, wherein the second cam profile is arranged in a plane transverse to the flat conveying surface.

16. A method of conveying an egg carrier comprising an egg accommodation, an egg clamping system to secure an egg in the egg accommodation, an operating system coupled with the egg clamping system to move the egg clamping system between an egg securing position and an egg release position, and at least two mutually movable coupled housing members that extend around a central axis of the egg carrier and the egg accommodation, wherein the egg clamping system is moveable between an egg securing position and an egg release position and the operating system comprises an operating member that is operable externally from the egg carrier, the method comprising one or more of the following steps:
   receiving an egg in the accommodation space;
   positioning the egg in a predetermined sampling position with respect to the egg carrier;
   securing the egg in the accommodation space, in the predetermined sampling position with respect to the egg carrier,
   tilting the egg carrier around a horizontal axis into a tilted position,
   maintaining the egg in the predetermined tilted during a settling time, prior to taking an allantoic fluid sample from the egg.

17. The method according to claim 16, wherein the settling time is at least 30 seconds.

18. The method according to claim 16, wherein in the tilted position the longitudinal axis of the egg makes an angle with the vertical of between 20° and 90°.

19. The method according to claim 16, further comprising tilting the egg carrier around the horizontal axis such that an opening of the egg accommodation is pointed downwards, and moving the egg clamping system to the egg release position to remove the egg out of the accommodation.

* * * * *